United States Patent
Ishizuka et al.

(10) Patent No.: US 6,570,660 B2
(45) Date of Patent: May 27, 2003

(54) MEASURING INSTRUMENT

(75) Inventors: Ko Ishizuka, Saitama (JP); Takayuki Kadoshima, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/863,461

(22) Filed: May 24, 2001

(65) Prior Publication Data
US 2002/0021448 A1 Feb. 21, 2002

(30) Foreign Application Priority Data
May 26, 2000 (JP) ........................................ 2000-157316

(51) Int. Cl.[7] .................................................. G01B 9/02
(52) U.S. Cl. ........................ 356/494; 356/499; 356/521
(58) Field of Search ................................ 356/494, 499, 356/521; 250/231.14, 231.16

(56) References Cited

U.S. PATENT DOCUMENTS

| | | | |
|---|---|---|---|
| 5,283,434 A | 2/1994 | Ishizuka et al. | |
| 5,390,022 A | 2/1995 | Ishizuka et al. | |
| 5,448,358 A | 9/1995 | Ishizuka et al. | |
| 5,481,106 A | 1/1996 | Nyui et al. | |
| 5,483,377 A | 1/1996 | Kaneda et al. | |
| 5,498,870 A | 3/1996 | Ishizuka | |
| 5,532,819 A * | 7/1996 | Ishizuka et al. | 250/237 G |
| 5,557,396 A | 9/1996 | Ishizuka et al. | |
| 5,569,913 A | 10/1996 | Ishizuka et al. | |
| 5,621,527 A | 4/1997 | Kaneda et al. | |
| 5,663,794 A | 9/1997 | Ishizuka | |
| 5,666,196 A | 9/1997 | Ishii et al. | |
| 5,680,211 A | 10/1997 | Kaneda et al. | |
| 5,880,839 A | 3/1999 | Ishizuka et al. | |
| 5,956,140 A | 9/1999 | Ishizuka et al. | |
| 6,005,667 A * | 12/1999 | Takamiya et al. | 356/499 |
| 6,151,185 A | 11/2000 | Ishizuka et al. | |
| 6,229,140 B1 | 5/2001 | Ishizuka | |

* cited by examiner

Primary Examiner—Constantine Hannaher
(74) Attorney, Agent, or Firm—Fitzpatrick, Cella, Harper & Scinto

(57) ABSTRACT

A light wave measuring instrument has a small optical system. Beams from a laser light source illuminate a grating scale and plus-first-order-diffracted and minus-first-order-diffracted beams from the grating scale are diffracted and reflected so as to travel through their original optical paths. The beams are returned to a non-polarization beam splitter, transmitted through a quarter wavelength plate and converted into one straight polarized beam having a polarization direction varying with the phase difference between the two beams. The straight beam is then separated. The separate beams are separated into P and S polarized beams. The S polarized beams are reflected by a polarization film, while the P polarized beams are reflected by a parallel glass plate. These beams are transmitted through the polarization film again to become coherence signal beams having reverse phases of fringes, which are then emitted in the same direction.

6 Claims, 7 Drawing Sheets

MEASURING INSTRUMENT

BACKGROUND OF THE INVENTION

1. Field of the Invention

The present invention relates to a measuring instrument used in industries to detect locational or angular information.

2. Related Background Art

The applicant has been making efforts to develop what is called a grating interference-type encoder for detecting variations in the position or speed of an object by applying the diffraction interference phenomenon of light.

In particular, the applicant has realized an encoder of a much higher resolution than geometrical optical encoders by employing a fine scale on the order of $\mu$m to obtain two diffracted beams, and causing them to interfere with each other.

This grating interference type encoder synthesizes the wave surfaces of the two diffracted beams to generate an interference pattern.

As in interference length measuring machines, however, a difference in polarization is established between the two beams and used to generate a plurality of phase difference signals, that is, an A phase signal and a B phase signal.

In general, light detecting elements such as a wavelength plate, a non-polarization or diffraction grating beam splitter, and a polarization plate or prism are arranged in a space so that corresponding light-receiving elements can detect emitted beams.

In the above described conventional example, however, the arrangement of optical parts for generating the phase difference signals is complicated, and the light-receiving elements are arranged in the space so as to correspond to the different signals. Accordingly, a large space is required, limiting the reduction of the size.

Further, four-piece photo diodes or the like may be used to make the electrical characteristics of the light-receiving elements uniform and to allow users to is use the encoder easily.

In this case, optical parts such as prisms of several mm size must be properly joined together so as to illuminate the light-receiving elements in parallel. Thus, expensive photodiodes having a light-receiving surface of several mm size at minimum must be used. With this method, the light-receiving elements have a large capacity and thus fail to provide a fast response performance.

SUMMARY OF THE INVENTION

It is an object of the present invention to solve the above problems to provide a measuring instrument having an optical system of a reduced size and an optical element that allows the size of the optical system to be reduced.

DETAILED DESCRIPTION OF THE DRAWINGS

DETAILED DESCRIPTION OF THE EMBODIMENTS

The present invention will be described below in detail with reference to FIGS. 1 to 9 showing embodiments thereof.

Figure 1:
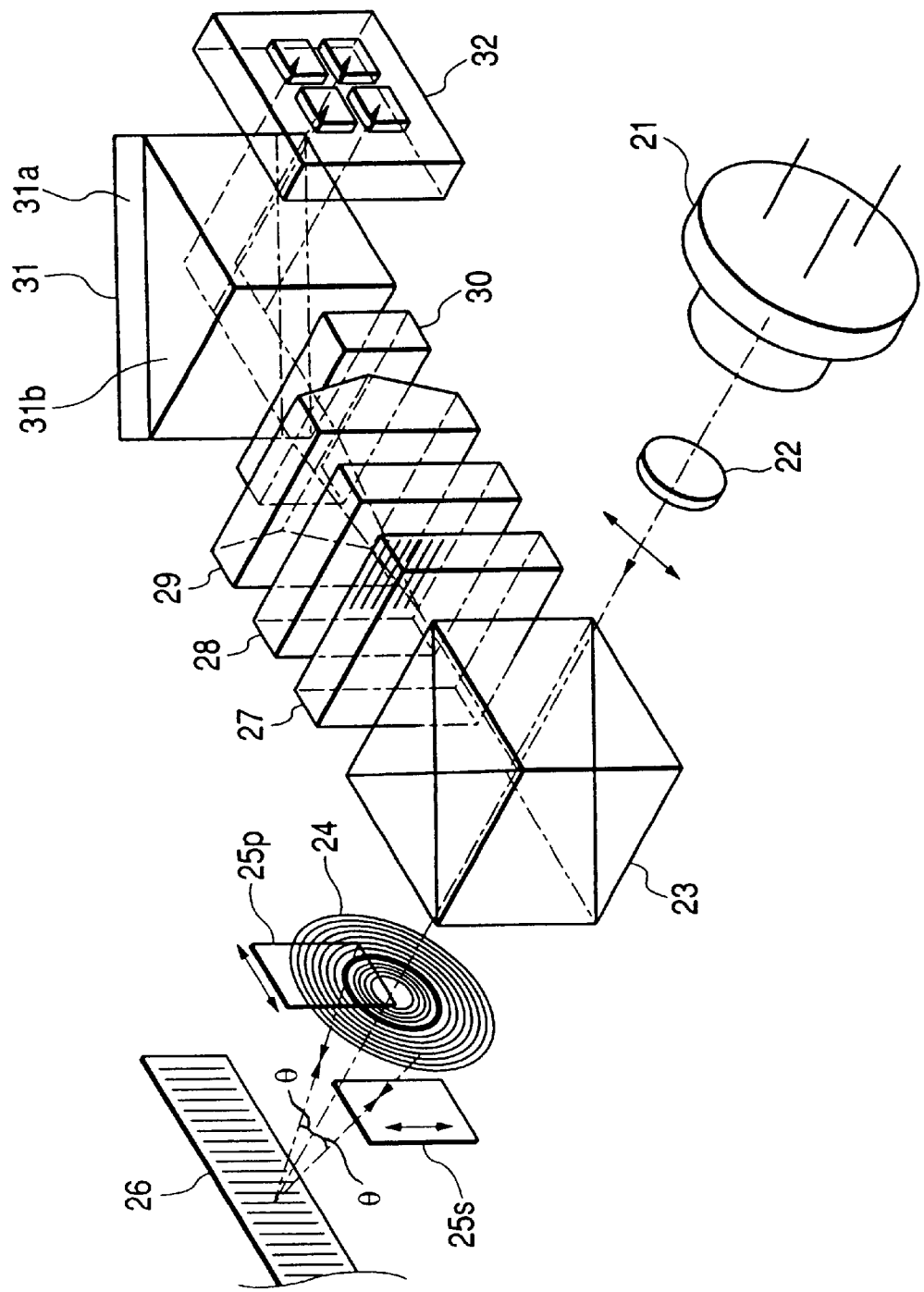
FIG. 1 is a view showing the configuration of a first embodiment.

FIG. 1 is a view showing the configuration of a first embodiment using an annular reflecting element.

A collimator lens 22, a non-polarization beam splitter 23, an annular reflecting grating 24, polarization plates 25S and 25P arranged in parallel and having light orientations shifted from each other through 90°, and a grating scale 26 are arranged in an emitting direction of a semiconductor laser light source 21.

Further, a polarization separating optical unit 31 composed of a quarter wavelength plate 27, a diffraction grating beam splatter 28, a prism 29, a half wavelength plate 30, a parallel glass plate 31a, and a rectangular prism 31b is arranged in a reflecting direction of the non-polarization beam splitter 23.

A four-piece light-receiving element 32 is arranged in a reflecting direction of the polarization separating optical unit 31.

A coherent beam emitted by a semiconductor laser light source 21 is transmitted through the non-polarization beam splitter 23 and then illuminates the grating scale 26 substantially perpendicularly.

First, reflected plus-first-order-diffracted light from the grating scale 26 is emitted at a diffraction angle $\ominus$, transmitted through the polarization plate 25S, and then diffracted and reflected to the original optical path by the annular reflecting grating 24.

The light is further plus-first-order-diffracted by the grating scale 26 to return to the non-polarization beam splitter 23.

The other reflected minus-first-order-diffracted light from the grating scale 26 is emitted in the opposite direction at the diffraction angle $\ominus$, transmitted through the polarization plate 25P, and then diffracted and reflected to the original optical path by the annular reflecting grating 24.

The light is further plus-first-order-diffracted by the grating scale 26 to return to the non-polarization beam splitter 23.

Since the polarization component of the beam applied to the diffraction grating scale 26 by the semiconductor laser light source 26 contains a straight polarization component, the plus/minus-order-diffracted beams propagated to the non-polarization beam splitter 23 have polarization directions shifted from each other through 90°. Thus, even when the wave surfaces overlap each other, interference fringes are prevented from occurring.

The two beams reflected by the non-polarization beam splitter 23 are transmitted through the quarter wavelength plate 27 and converted into one straight polarized beam having its polarization orientation varying with the phase difference between the two original beams.

This beam is divided by the diffraction grating beam splitter 28 into two beams separated through a certain angle.

The two beams further have their optical paths made substantially parallel with each other by the prism 29. The purpose of making the optical paths of the two beams parallel with each other is to facilitate the arrangement of the parts, and the prism 29 is not essential. In the optical path of one of the two beams obtained by the separation is arranged a half wavelength plate 30 having an optical axis shifted from the optical path of this beam through 22.5°.

Thus, the straight polarization orientations of the two beams are shifted from each other through 45°, and rotate depending on the phase difference between the wave surfaces of the two beams.

The two beams are incident on the polarization separating optical unit 31 in parallel. The optical unit 31 is formed by depositing a polarization film on one of the surfaces of a parallel glass plate 31a, forming on the opposite surface of the parallel glass plate 31a into a reflection surface, and joining the parallel glass plate to an inclined surface of a rectangular prism 31b.

The rear surface of the parallel glass plate 31a may totally reflect light. Additionally, the polarization film may be deposited on the inclined surface of the rectangular prism 31b.

Accordingly, light is separated into P and S polarized beams by the polarization film. The S polarized beam is reflected by the polarization film, while the P polarized beam component is reflected by the reflection surface of the parallel glass plate 31a. These beams are transmitted through the polarization film again to become interference signal beams having reverse phases of fringes, which are emitted in the same direction.

The interval between the optical paths of these two beams is 2½ ($\sqrt{2}$) times as large as the thickness of the parallel glass plate 31a; it is about 1 mm if the parallel glass plate 31a has a thickness of 0.7 mm.

Further, the beam that has passed through the half wavelength plate 30 and the beam that has not passed through it have phases of fringes shifted from each other through 90°.

These four beams are incident on the corresponding light-receiving areas of the four-piece light-receiving element 32 in parallel.

The four light-receiving areas are each of about 1×1 mm size and are arranged at intervals of 1 mm. Accordingly, with a beam diameter of 1 mm or less, the beams can be separately entered into the predetermined light-receiving areas.

The light-receiving areas of about 1×1 mm size normally have a static capacity of several pF to provide a fast response performance equal to several MHz or more which is suitable for the fields of encoders and light wave interference-type measuring instruments.

Figure 2:
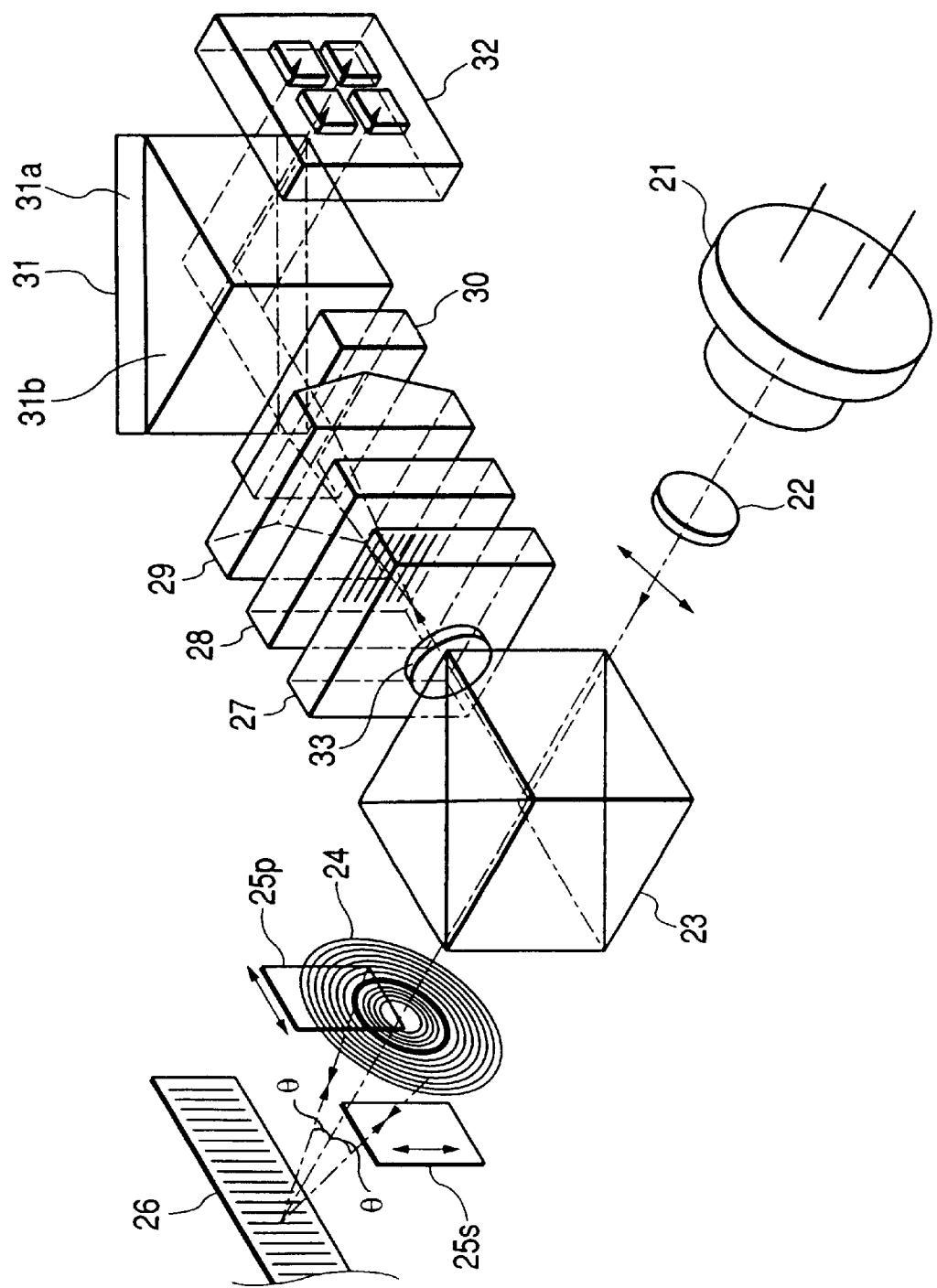
FIG. 2 is a view showing the configuration of a second embodiment.

FIG. 2 is a view showing the configuration of a second embodiment to which an array of small light-receiving elements are applied. In this embodiment a condenser lens 33 is additionally provided before the quarter wavelength plate 27 of the is first embodiment so that light is substantially condensed on a surface of the four-piece light-receiving element 32.

Similar effects are obtained if the condenser lens 33 is inserted between the non-polarization beam splitter 23 and the diffraction grating beam splitter 28.

Thus, the condenser lens 33 reduces the diameter of a signal beam which is larger than the size of the light-receiving area, thus making it possible to separate a polarized beam into very small pieces depending on the thickness of the parallel glass plate 31a. Consequently, smaller divided light-receiving elements 32 can be used to improve the fast response performance and realize small packaging.

Figure 3:
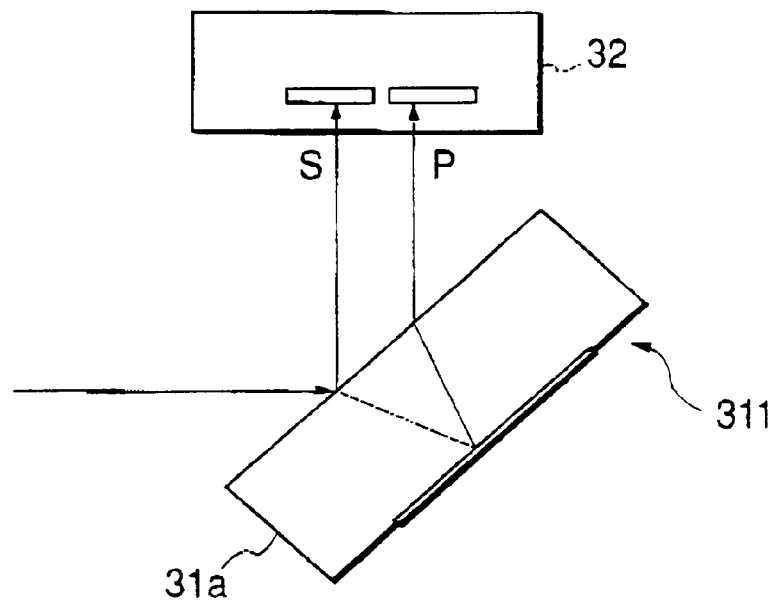
FIG. 3 is an explanatory representation of a variation of a polarization separating optical unit.
Figure 4:
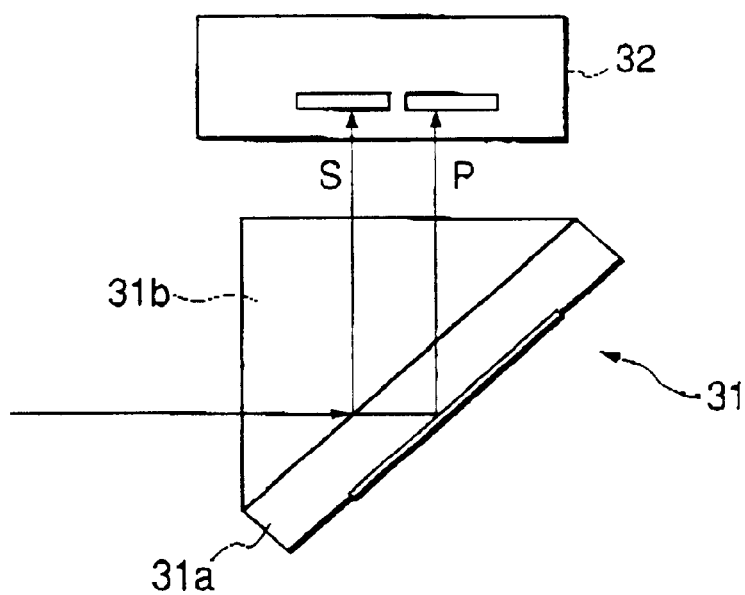
FIG. 4 is an explanatory representation of a variation of the polarization separating optical unit.
Figure 5:
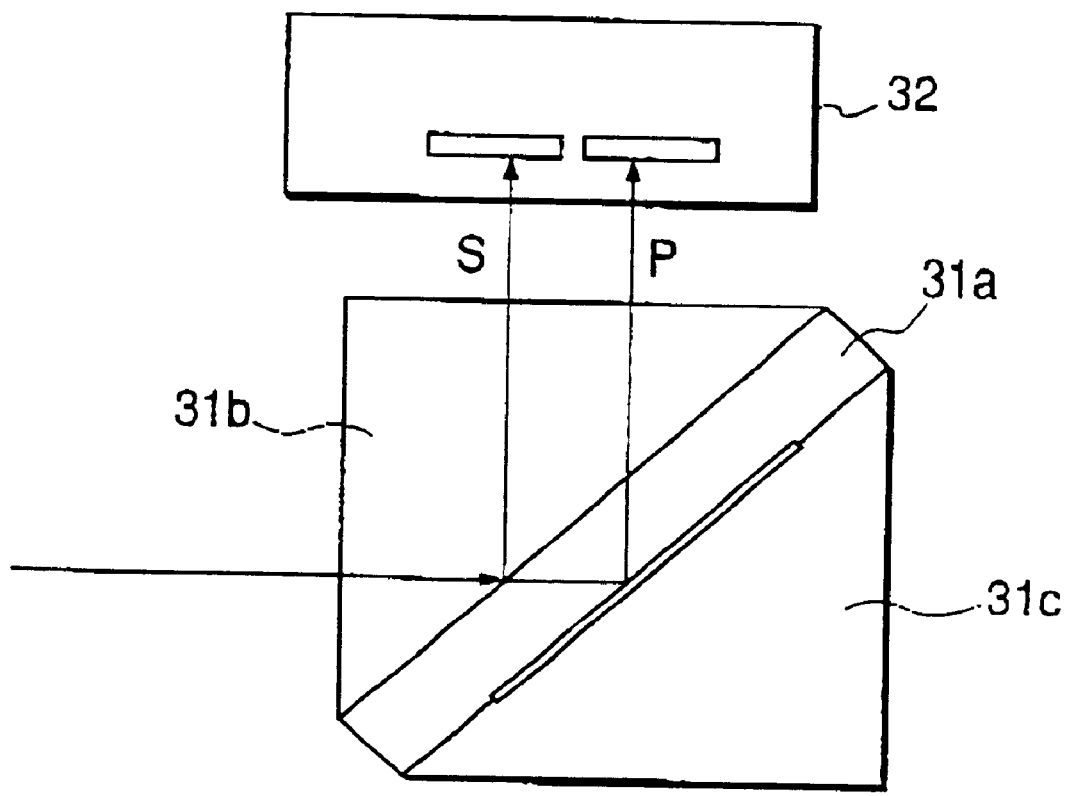
FIG. 5 is an explanatory representation of a variation of the polarization separating optical unit.

FIGS. 3 to 5 are sectional views of another polarization separating optical unit 311 with a variation of the polarization separating optical unit 31. In FIG. 3, a polarization separating film is deposited on one of the surfaces of the parallel glass plate 31a, whereas a reflection film is deposited on the opposite surface thereof. Thus, the polarization separating optical unit 31 can be manufactured simply by depositing these films on the corresponding surfaces of the parallel glass plate 31a and then cutting it, thereby contributing to mass production.

In FIG. 4, a polarization film and a reflection film are deposited on the corresponding surfaces of the parallel glass plate 31a, and the prism 31b is joined to the polarization film side. In FIG. 5, the prism 31b and a prism 31c are jointed to the corresponding surfaces of the parallel glass plate 31a.

The films may be deposited on the prism.

In either case, as in the first embodiment, light enters the polarization film at 45° relative to the parallel glass plate 31a, thus providing a polarization separating optical unit 31 with an excellent polarization separating characteristic.

Further, in FIG. 5, the substantially rectangular parallelopiped shape facilitates the incorporation of the unit into the equipment.

Figure 6:
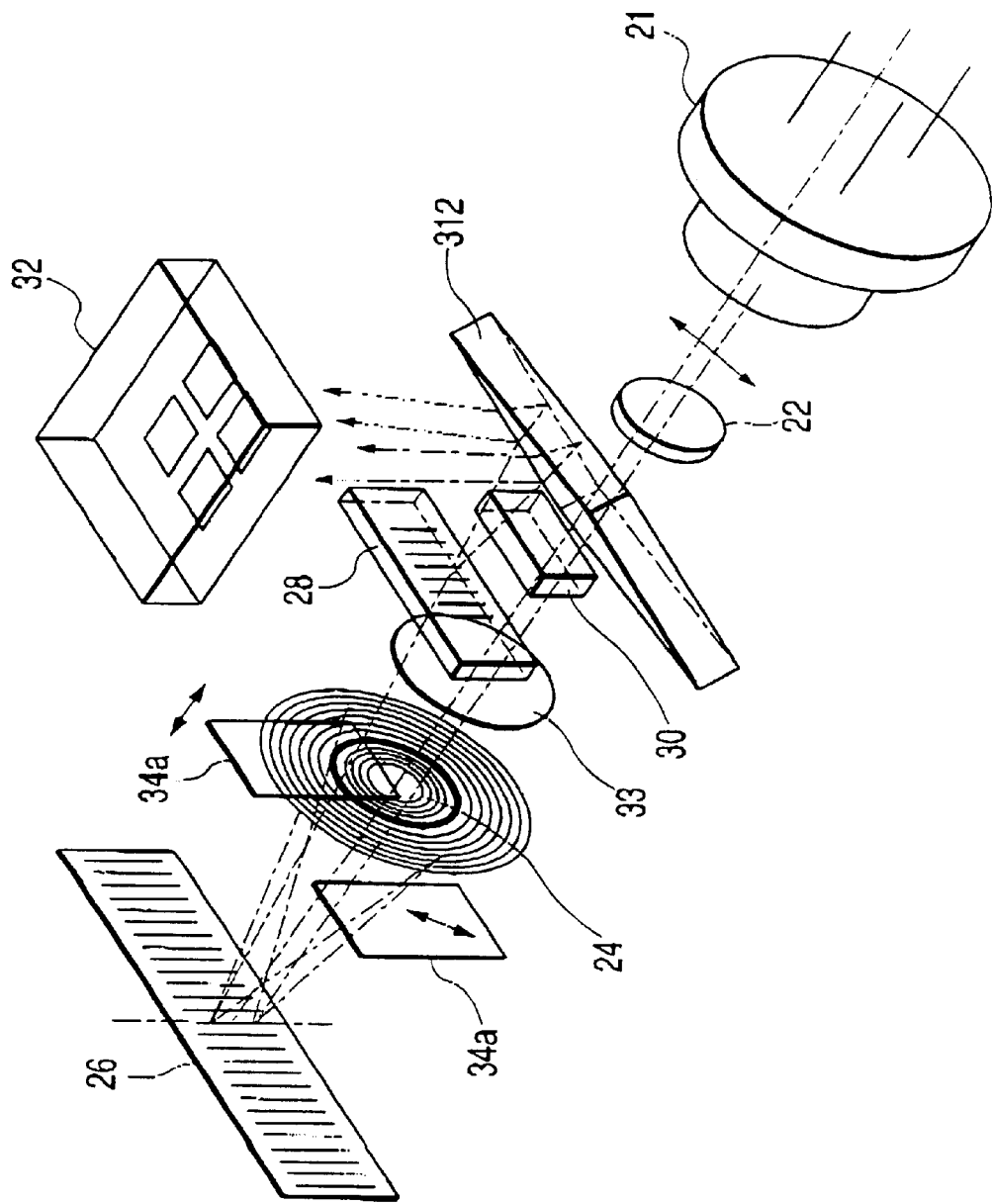
FIG. 6 is a view showing the configuration of a third embodiment.

FIG. 6 is a view showing the configuration of an encoder according to a third embodiment. A polarization separating optical unit 312, the half wavelength plate 30, the diffraction grating beam splitter 28, and the condenser lens 33 are arranged between the collimator lens 22 and the annular reflecting grating 24.

Further, two one-eighth wavelength plates 34a and 34b are inserted between the annular reflecting grating 24 and the grating scale 26. This enables both the spatial separation of the optical path of an illuminating laser beam from the optical path of a diffracted beam as a signal beam and the generation of the above described phase difference signal, that is, polarization separation, thus eliminating the need for the non-polarization beam splitter 23 in FIG. 1 to contribute to size reduction.

Figure 7:
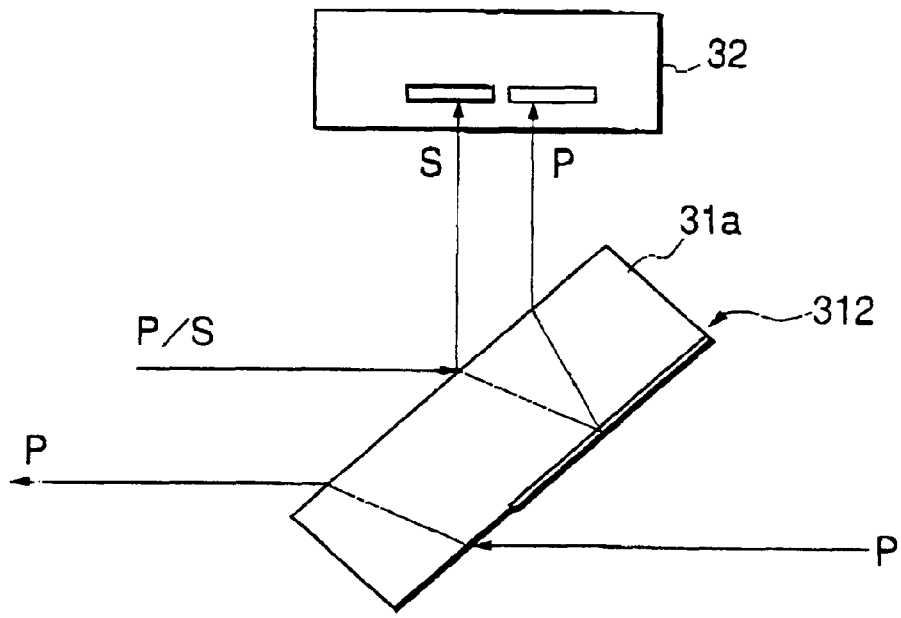
FIG. 7 is an explanatory representation of a variation of a polarization separating optical unit.

In this case as shown in FIG. 7, the polarization separating optical unit 312 has a reflection film formed on a surface thereof which is closer to the semiconductor laser light source 21, the reflection film partly comprising a transmission section. The polarization separating optical unit 312 has a polarization film formed on a surface thereof which is closer to the grating scale 26.

In FIG. 6, a beam from the semiconductor laser light source 21 as a coherence light source is transmitted through the transmission section of the polarizing separating optical unit 312 and then through the polarization film on the opposite side and is then focused by the condenser lens 33 to illuminate the grating scale 26. A desired polarization direction of the beam can be obtained by properly setting the mounting direction of the semiconductor laser light source 21 so that substantially 100% of the beam can be transmitted through the polarization film of the polarization separating optical unit 312.

First, reflected plus-first-order-diffracted light from the grating scale 26 is emitted at a diffraction angle $\ominus$ to illuminate the annular reflecting grating 24 via the one-eighth wavelength plates 34a and 34b. Due to the focusing effect of the condenser lens 33, however, the light is condensed on the annular reflecting grating 24.

The beam diffracted and reflected by the annular reflecting grating 24 is further plus-first-order-diffracted by the grating scale 26 to return to the diffraction grating beam splitter 28.

The reflected minus-first-order-diffracted light is emitted in the opposite direction at the diffraction angle $\ominus$ and diffracted, subsequently reflected by the annular reflecting grating 24, arranged in front of the diffraction grating beam splitter 28, and then minus-first-order-diffracted by the grating scale 26 to return to the diffraction grating beam splitter 28.

In this embodiment, the one-eighth wavelength plates 34a and 34b are inserted into the optical path between the grating scale 26 and the annular reflecting grating 24 in such a manner that the one-eighth wavelength plates have their optical axes shifted from each other through 90° and inclined through 45° from the polarization surface of the semiconductor laser light source 21. Accordingly, when propagated to the polarization separating optical unit 312, the plus/minus-first-order-diffracted beams become a single straight polarized beam having its polarization orientation varying with the phase difference between these two beams.

These diffracted beams are spatially shifted from the optical path of the illumination beam from the semiconductor laser light source 21, substantially in parallel therewith.

These diffracted beams are separated from each other through a certain angle by the diffraction grating beam splitter 28. One of the beams is transmitted through the half wavelength plate 30 by shifting its optical axis through 22.5° from its original one, so that the straight polarized beams have their polarization directions shifted from each other through 45°.

The polarization directions of the two beams rotate depending on the phase difference between the wave surfaces of the two beams.

Both beams further fall on the polarization separating optical unit 312, where they are separated into a reflected beam of an S polarization component and a transmitted beam of a P polarization component. The reflected beam is reflected by a reflection section of the polarization separating optical unit 31.

The fringe signal beams of the P and S polarization components become interference signal beams having reverse phases of fringes. Further, the beam that has passed through the half wavelength plate 30 and the beam that has not passed through it have their phases of fringes shifted from each other through 90°. These four beams enter the corresponding light-receiving areas of the four-piece-light-receiving element 32.

Figure 8:
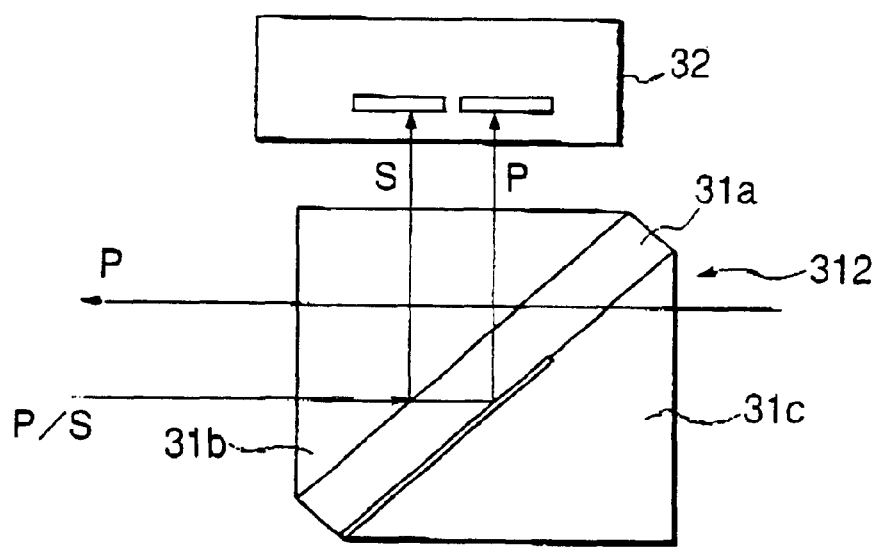
FIG. 8 is an explanatory representation of a variation of the polarization separating optical unit.

FIG. 7 is a sectional view of an integral part of the polarization separating optical unit 312 using only the parallel glass plate 31a and which is used in a third embodiment. FIG. 8 shows an example of a form in which the rectangular prisms 31b and 31c are joined to the corresponding sides of the parallel glass plate 31a in such a manner as to sandwich the parallel glass plate 31a therebetween.

The polarization separating optical units 31, 311, and 312 are not limited to encoders using annular reflecting elements, but may be applied to phase difference signal generating optical systems of encoders based on a grating interference method utilizing diffraction and polarization and may be used for light wave interference-type measuring instruments utilizing polarization.

Figure 9:
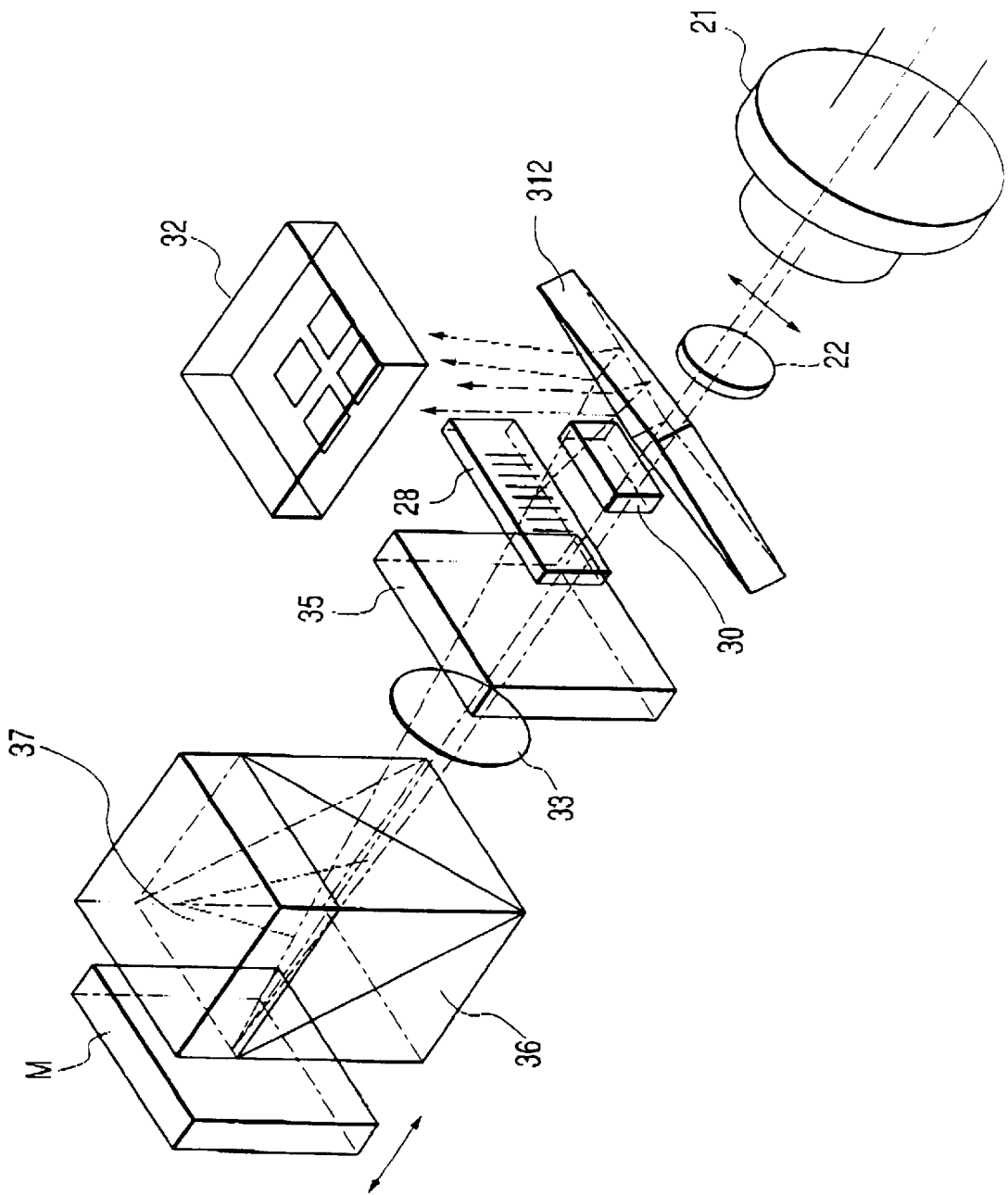
FIG. 9 is a view showing a configuration in which the present invention is applied to an optical length measuring instrument.

FIG. 9 is a view showing a configuration in which the present invention is applied to a small light measuring machine using polarization interference. The collimator lens 22, the polarization separating optical unit 312, the half wavelength plate 30, the diffraction grating beam splitter 28, the quarter wavelength plate 35, the condenser lens 33, a small polarization prism 36, and a reflection surface M of a measured member are arranged in the emitting direction of the semiconductor laser light source 21. The small polarization prism 36 has a reference reflection plane 37 formed thereon.

Beams from the semiconductor laser light source 21 are made substantially parallel with each other by the collimator lens 22 and then transmitted through a window section of the polarization separating optical unit 312 and the quarter wavelength plate 35 to become circular polarized beams. The beams are further transmitted through the condenser lens 33 and separated into transmitted P polarized beams and reflected P polarized beams by the small polarization prism 36. The beams transmitted through the small polarization prism 36 illuminate the reflection surface M of the measured member, and the beams reflected by the small polarization prism 36 illuminate the reference reflection plane 37. These beams are multiplexed in the small polarization prism 36. The illuminated members for the transmitted and reflected beams may be reversed.

The beams obtained by the multiplexing in the small polarization prism 36 are, at this time, straight polarized beams having orthogonal polarization planes but are then transmitted through the condenser lens 33 and then the quarter wavelength plate 35, where they are multiplexed into one straight polarized beam. This straight polarized beam has a polarization direction varying with the phase difference between the two beams reflected from the reflection surface M of the measured member and from the reference reflection plane 37, that is, the difference between the distance to the reflection surface M and the distance to the reference reflection plane 37; the direction of the straight polarized beam rotates when the phase difference between the two beams varies. The straight polarized beam travels substantially in parallel with the optical path of the illumination beam from the semiconductor laser light source 21 while being spatially shifted therefrom. Furthermore, the beam is further spatially separated by the diffraction grating beam splitter 28 into two beams shifted from each through a certain angle, by dividing the amplitude of said beam into two. The half wavelength plate 30 is inserted into the optical path of one of the beams so as to shift its optical axis through 22.5°, thereby shifting the orientations of the straight polarized beams from each other through 45°.

These two beams enter the polarization separating optical unit 312, so that P polarized beam components are transmitted therethrough, while S polarized beam components are reflected therefrom. The transmitted beams are reflected by the reflection film inside the polarization separating optical unit 31, and these beams then travel in parallel and fall on the four-piece light-receiving element 32.

A 4-phase sine wave signal having phases shifted from each other through 90° is output from the light-receiving element 32. One cycle of this sine wave signal occurs each time the measured member moves a distance corresponding to the half of the wavelength, so that the distance to the reflection surface M can be measured by analyzing this signal.

What is claimed is:

1. A measuring instrument for applying a coherence beam to a relatively moving object to be measured, multiplexing a plurality of beams reflected from the object to be measured to cause them to interfere with each other to generate a periodic signal beam associated with movement of the relatively moving object, and directly outputting the signal beam or causing a light-receiving element to photoelectrically convert the signal beam into an electric signal to output this electric signal, the measuring instrument comprising:

a light-emitting device for emitting a coherence beam;

an illumination system for applying the beam emitted by the light-emitting device to the object to be measured;

a first beam splitting optical system for converting a reflected beam multiplexed by the object to be measured into a straight polarized beam, then separating the straight polarized beam into two beams, and then shifting the orientation of one of the straight polarized beams from that of the other by an angle corresponding to half of a wavelength;

a second beam splitting optical system for separating the two beams obtained by the separation by the first beam splitting optical system, into polarization components; and a light sensing device comprising a plurality of light-receiving elements for individually receiving the beams which have been separated into the plurality of polarization components.

2. An apparatus of claim 1, wherein said object to be measured is a diffraction grating scale that superposes wave surfaces of beams reflected and diffracted by said diffraction grating and having different orders, to allow these beams to interfere with each other to thereby generate a periodic signal beam associated with movement of the object to be measured.

3. An apparatus of claim 1, wherein a reflection member is formed on said object to be measured so that one of said plurality of reflected beams which is reflected from the reflection member formed on the object to be measured and another reflected from a reference position reflection plane formed in said illumination system have wave surfaces thereof superposed on each other for interference, to thereby generate a periodic signal beam associated with movement of the object to be measured.

4. An apparatus of claim 1 wherein said second beam splitting optical system comprises an optical element for converting one straight polarized beam with a rotating polarization direction into divided beams emitted in substantially the same direction, using at least one polarization film and one reflection surface which is parallel therewith.

5. An apparatus of claim 4, wherein said polarization film and reflection surface of said optical element used are formed as a pair of opposite surfaces of a parallel plate.

6. An apparatus of claim 5, wherein the reflection surface side of said optical element comprises a transmission section.

* * * * *

UNITED STATES PATENT AND TRADEMARK OFFICE
CERTIFICATE OF CORRECTION

PATENT NO. : 6,570,660 B2
DATED : May 27, 2003
INVENTOR(S) : Ko Ishizuka et al.

It is certified that error appears in the above-identified patent and that said Letters Patent is hereby corrected as shown below:

Column 1,
Line 33, "above described" should read -- above-described --; and
Line 41, "to is" should read -- to --.

Column 3,
Line 61, "the is" should read -- the --.

Column 4,
Line 42, "above described" should read -- above-described --; and

Column 8,
Line 17, "claim 1" should read -- claim 1, --.

Signed and Sealed this

Second Day of December, 2003

JAMES E. ROGAN
*Director of the United States Patent and Trademark Office*